Dec. 13, 1932.   F. O. PASCHALL   1,891,053
RADIO GRID LEAK
Filed June 1, 1927

Inventor:
Frederick Olivier Paschall

Patented Dec. 13, 1932

1,891,053

UNITED STATES PATENT OFFICE

FREDERICK OLIVIER PASCHALL, OF BROOKLYN, NEW YORK

RADIO GRID LEAK

Application filed June 1, 1927. Serial No. 195,725.

The invention relates to improvement in grid leaks in which a little block of anthracite coal is grounded on one side, by direct contact while on the opposite side it has two contacts, separated from each other by a space of ⅛ of an inch.

The device can be clipped into a standard grid condenser having clips, and grounded.

This arrangement provides a grounded field of coal, which acts as a suction for that portion of the signal which the tube cannot handle, thus allowing this unused portion to leak off gradually into the ground, which seems the logical place for it to flow, thus taking this undesired leakage entirely out of the set, instead of merely setting it loose and leaving it to seek its own outlet, which heretofore, has been into the coils, batteries and other instruments and which naturally interferes with the good part of the signal and causes distortion on certain dial settings.

The block of coal is ground smooth on all sides and measures about ⅝ inch long by ⅜ inch deep by ⅝ inch wide. The depth, however, will vary according to the capacity desired.

This leak is to be used in the regular way, but its connections differ from other leaks in that it has a small hole in the centre of the top of the box through which a ground wire passes and connects to the ground plate, referred to as the third contact member. The other two connections are at each end of the box and are the main ones, one connecting to the secondary winding of the detector coil (or tuner) and the other to the grid of the tube.

To the accomplishment of the foregoing my invention consists of the elements and their relation one to the other, as hereinafter particularly described and sought to be defined in the claims: reference being had to the accompanying drawing which shows the preferred embodiment of my invention, and in which Fig. 1 is a cross-section view of the box, or housing, which is made of insulating material such as hard rubber, and shows the lower contact members, C., in place, with a space of about ⅛ of an inch separating them and a threaded machine bolt D. Fig. 2 holding each plate in place against each end of the box and extending beyond each end of the box about $\frac{3}{16}$ of an inch for connections and showing a small hole in the top of the box through which the ground wire passes.

Figure 1:
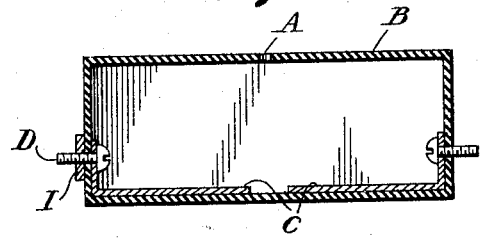
Figure 2:
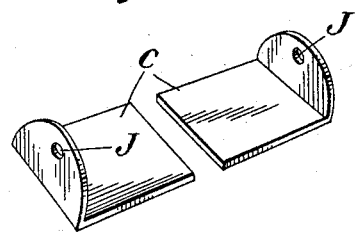
Fig. 2 shows the lower contact members, made of brass, thin and pliable enough to conform to any slight unevenness on the face of the coal. These plates are each turned up at right angles at one end and a small hole placed in the turned up end for the contact bolt to pass through, the head of the bolt holding it on the inner side and a small nut screwed on the outside firmly.
Figure 4:
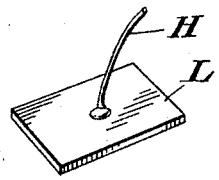
Fig. 4 shows the upper contact member, known as the ground plate, made of smooth flat brass about $\frac{1}{16}$ of an inch thick and varying in length and breadth so as to work in conjunction with the varying thicknesses of coal in producing different values in megohms. The larger this plate is the lower will be the megohm value.
Figure 3:
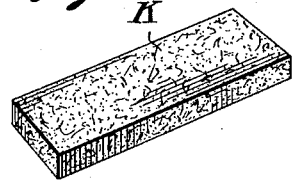
Fig. 3 shows the block of coal, ground smooth and flat on top and bottom and measuring about ⅝ of an inch long by ⅝ of an inch wide and varying in thickness from about ⅛ to ½ of an inch, according to capacity desired: the thicker the coal is the higher the capacity in megohms.

This ground plate has a flexible wire, H, Fig. 4 soldered to the top, in centre, to which the ground connection is made.

Figure 5:
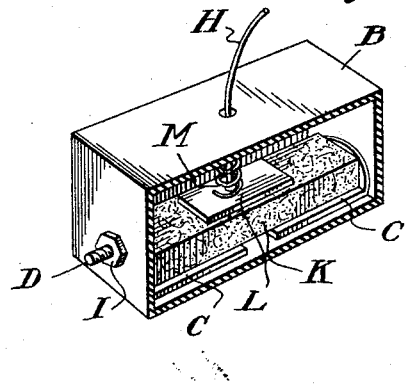

Fig. 5 shows a cross-section view of all the elements in place and under pressure of the spiral spring, which spring is coiled around the ground wire H, in Fig. 4 and serves to hold all the members in engagement, the spring pressing firmly against the top of the box.

It will be further apparent that numerous changes and modifications may be made in the structure disclosed without departing from the spirit of the invention defined in the following claims.

I claim:

1. A grid leak comprising an insulated box, a block of coal within the box, two lower contact members and a single upper contact member engaging the coal, a spring located between the upper contact member and the box which serves to hold the coal and contacts into firm engagement, and terminal means connected to each of the contact members.

2. A grid leak comprising an insulated box containing a block of coal and two lower contact members and one upper contact member, each member being held into firm engagement with the coal and with terminal means connected to each member.

3. A grid leak comprising a piece of coal with two lower contact members and one upper contact member making firm engagement with the coal, the two lower members engaging the coal in different places and all three contact member having terminal means.

In testimony whereof, I, FREDERICK OLIVIER PASCHALL, have signed my name to this specification this 28th day of May 1927.

FREDERICK OLIVIER PASCHALL.